United States Patent
Nahata et al.

(10) Patent No.: US 11,012,343 B2
(45) Date of Patent: May 18, 2021

(54) SYSTEMS AND METHODS FOR AUTOMATICALLY PACKAGING AND DEPLOYING VIRTUAL NETWORK FUNCTIONS BASED ON NETWORK INTERFACE DEPENDENCIES AND COMPATIBILITIES

(71) Applicant: Verizon Patent and Licensing Inc., Arlington, VA (US)

(72) Inventors: Hans Raj Nahata, New Providence, NJ (US); Ravi Potluri, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 17 days.

(21) Appl. No.: 16/598,587

(22) Filed: Oct. 10, 2019

(65) Prior Publication Data
US 2021/0111981 A1   Apr. 15, 2021

(51) Int. Cl.
*G06F 11/00*   (2006.01)
*H04L 12/26*   (2006.01)
*H04L 12/46*   (2006.01)
*H04L 12/24*   (2006.01)
*G06F 9/455*   (2018.01)

(52) U.S. Cl.
CPC .......... *H04L 43/50* (2013.01); *G06F 9/45558* (2013.01); *H04L 12/4641* (2013.01); *H04L 41/0806* (2013.01); *H04L 41/0893* (2013.01); *G06F 2009/4557* (2013.01); *G06F 2009/45595* (2013.01)

(58) Field of Classification Search
CPC . H04L 43/50; H04L 41/0893; H04L 41/0806; H04L 12/4641; G06F 9/45558; G06F 2009/4557; G06F 2009/45595

USPC ......................................................... 370/241
See application file for complete search history.

(56) References Cited

U.S. PATENT DOCUMENTS 9,794,160 B1 * 10/2017 Felstaine ................. H04L 43/04
2017/0272523 A1 *  9/2017 Cillis ................... H04L 41/082
(Continued)

OTHER PUBLICATIONS

ETSI, "Network Functions Virtualization (NFV) Release 2; Protocols and Data Models; VNF Package specification", Sep. 2018, 21 pages. (From Applicant's IDS) (Year: 2018).*

(Continued)

*Primary Examiner* — Mang Hang Yeung

(57) ABSTRACT

A device may receive information identifying existing virtual network functions (VNFs) associated with an existing virtual radio access network (VRAN), and may receive information identifying proposed VNFs to deploy with the existing VRAN, wherein the information identifying the proposed VNFs includes VNF descriptors indicating interface dependencies associated with the proposed VNFs. The device may generate testing configurations, for testing the proposed VNFs, based on the interface dependencies, and may determine that a set of the proposed VNFs are validated based on testing the proposed VNFs with the testing configurations. The device may derive dependency constraints for the set of the proposed VNFs based on the information identifying the existing VNFs, and may select a new VNF that satisfies the dependency constraints, based on the set of the proposed VNFs. The device may cause the new VNF to be deployed with the existing VRAN.

20 Claims, 13 Drawing Sheets

(56) References Cited

U.S. PATENT DOCUMENTS

2018/0121335 A1* 5/2018 Cillis .................. G06F 11/3688
2019/0104047 A1* 4/2019 Tejaprakash ............ H04L 41/22
2020/0267072 A1* 8/2020 Prasad ................ G06F 9/45558

OTHER PUBLICATIONS

ETSI, "Network Functions Virtualization (NFV) Release 2; Protocols and Data Models; NFV descriptors based on TOSCA specification", Dec. 2018, 205 pages. (From Applicant's IDS) (Year: 2018).*

ETSI, "Network Functions Virtualisation (NFV) Release 2; Protocols and Data Models; VNF Package specification", Sep. 2018, 21 pages.

ETSI, "Network Functions Virtualisation (NFV) Release 2; Protocols and Data Models; NFV descriptors based on TOSCA specification,", Dec. 2018, 205 pages.

* cited by examiner

SYSTEMS AND METHODS FOR AUTOMATICALLY PACKAGING AND DEPLOYING VIRTUAL NETWORK FUNCTIONS BASED ON NETWORK INTERFACE DEPENDENCIES AND COMPATIBILITIES

BACKGROUND

Network functions virtualization management and orchestration (NFV-MANO) is an architectural framework for managing and orchestrating virtualized network functions (VNFs) and other software components. The NFV-MANO architecture facilitates deployment and connection of services that are removed from dedicated physical devices and moved to virtual machines (VMs).

DETAILED DESCRIPTION OF PREFERRED EMBODIMENTS

Figure 1A:
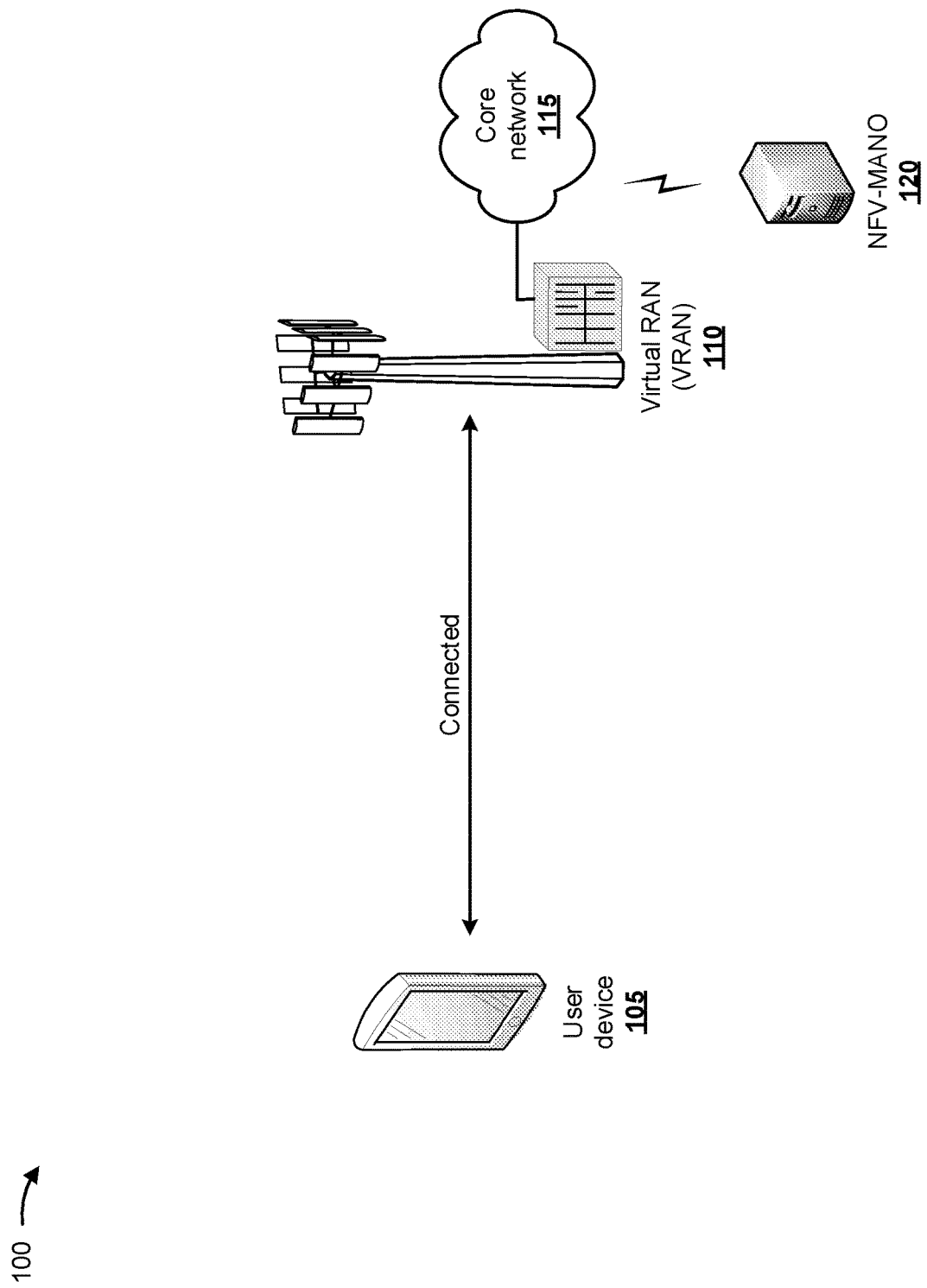
FIGS. 1A-1J are diagrams of one or more example implementations described herein.

The following detailed description of example implementations refers to the accompanying drawings. The same reference numbers in different drawings may identify the same or similar elements.

The NFV-MANO architecture includes a format for a VNF descriptor (VNFD) and a format for overall VNF packaging. These formats are intended to assist with onboarding, cataloging, and deploying VNFs. However, these may unnecessarily limit the definitions to a VNF to be deployed, without considering relationships and dependency constraints associated with existing VNFs provided in a network. Such limitations significantly impact an ability to automate deployment of complex network service chains in networks, such as a fifth generation (5G) network. Without automation, a massive deployment of small cells (e.g., represented by VNFs) in a network is impractical, and on-demand topological changes to the network are impossible. This wastes computing resources (e.g., processing resources, memory resources, and/or the like), communication resources, networking resources, and/or the like associated with unsuccessfully attempting to implement changes to existing networks with VNFs, deploy new VNFs in the existing networks, generate a new network with new VNFs, and/or the like.

Some implementations described herein provide a device (e.g., an NFV-MANO) that automatically packages and deploys VNFs in a network based on network interface dependencies and/or compatibilities. For example, the NFV-MANO may receive information identifying existing VNFs associated with an existing virtual radio access network (VRAN), and may receive information identifying proposed VNFs to deploy with the existing VRAN. The information identifying the proposed VNFs may include VNF descriptors indicating interface dependencies associated with the proposed VNFs. The NFV-MANO may generate testing configurations, for testing the proposed VNFs, based on the interface dependencies indicated by the VNF descriptors, and may determine that a set of the proposed VNFs are validated based on testing the proposed VNFs with the testing configurations. The NFV-MANO may derive dependency constraints for the set of the proposed VNFs based on the information identifying the existing VNFs, and may select at least one new VNF that satisfies the dependency constraints, based on the set of the proposed VNFs. The NFV-MANO may generate a new deployment layout based on the at least one new VNF, and may cause the new deployment layout to be implemented with the existing VRAN.

In this way, by including network interface dependencies and/or compatibilities in VNF descriptors, the NFV-MANO may automatically package and deploy VNFs in a network. The NFV-MANO may provide a real-time, on-demand solution that enables proper interconnectivity of new VNFs in the network with existing VNFs for utilization efficiency, mobility support, and/or the like. Thus, the NFV-MANO conserves computing resources, communication resources, networking resources, and/or the like that would otherwise be wasted unsuccessfully attempting to implement changes to existing networks with VNFs, deploy new VNFs in the existing networks, generate a new network with new VNFs, and/or the like.

FIGS. 1A-1J are diagrams of one or more example implementations 100 described herein. As shown in FIG. 1A, a user device 105 may be connected to a virtual radio access network (RAN) or VRAN 110, a core network 115, and an NFV-MANO 120. VRAN 110 may include one or more centralized units (CU), one or more distributed units (DUs), and one or more radio transmitters. One or more of the CUs and/or the DUs in VRAN 110 may be implemented by VNFs. Core network 115 may include an example architecture of a 5G next generation (NG) core network included in a 5G wireless telecommunications system, and may include physical elements, virtual elements, or a combination of physical and virtual elements. NFV-MANO 120 may facilitate orchestration and management of VNFs in VRAN 110.

Figure 1B:
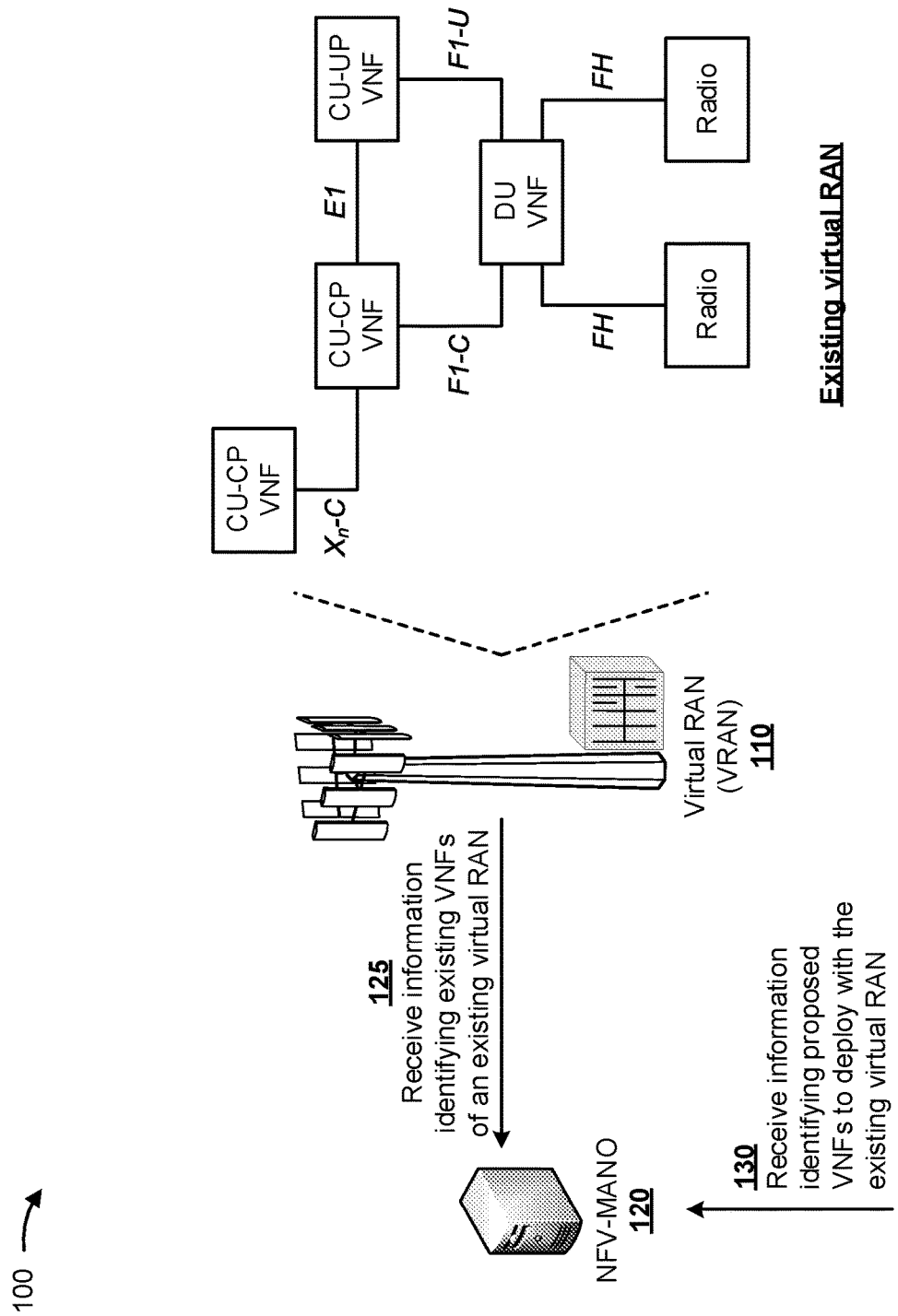

As shown in FIG. 1B, and by reference number 125, NFV-MANO 120 may receive (e.g., from VRAN 110) information identifying existing VNFs of an existing virtual RAN (e.g., the VNFs of VRAN 110). In some implementations, NFV-MANO 120 may periodically receive the information identifying the existing VNFs of VRAN 110, may continuously receive the information identifying the existing VNFs of VRAN 110, may receive the information identifying the existing VNFs of VRAN 110 based on a request, and/or the like. In some implementations, NFV-MANO 120 may store the information identifying the existing VNFs of VRAN 110 in a data structure (e.g., a database, a table, a list, and/or the like) associated with NFV-MANO 120.

In some implementations, the existing VNFs may include VNFs representing one or more CUs and one or more DUs. For example, the existing VNFs may include a first control plane CU (CU-CP) VNF, a second CU-CP VNF, a user plane CU (CU-UP) VNF, and a DU VNF. The DU VNF may be associated with one or more radio transmitters (e.g., base stations). Interfaces may be provided between the VNFs of VRAN 110 and between the VNFs and the radio transmitters. For example, a first interface may be provided between the first CU-CP VNF and the second CU-CP VNF (e.g., an $X_n$-C interface), a second interface may be provided between the second CU-CP VNF and the CU-UP VNF (e.g., an E1 interface), a third interface may be provided between the second CU-CP VNF and the DU VNF (e.g., an F1-C interface), a fourth interface may be provided between the CU-UP VNF and the DU VNF (e.g., an F1-U interface), a fifth interface may be provided between the DU VNF and the first radio transmitter (e.g., an FH interface), a sixth interface may be provided between the DU VNF and the second radio transmitter (e.g., an FH interface), and/or the like.

As further shown in FIG. 1B, and by reference number 130, NFV-MANO 120 may receive (e.g., from user device 105) information identifying proposed VNFs to deploy with the existing virtual RAN (e.g., VRAN 110). In some implementations, NFV-MANO 120 may periodically receive the information identifying the proposed VNFs, may receive the information identifying the proposed VNFs based on a request, may receive the information identifying the proposed VNFs based on completion of a software development action (e.g., an automated software development action), may receive the information identifying the proposed VNFs based on user input, and/or the like. For example, NFV-MANO 120 may receive the information identifying the proposed VNFs based on a request to modify the topology of VRAN 110 due to changing loads, demands, and/or the like of VRAN 110. In some implementations, NFV-MANO 120 may store the information identifying the proposed VNFs in a data structure (e.g., a database, a table, a list, and/or the like) associated with NFV-MANO 120. In some implementations, the proposed VNFs may include one or more CUs (e.g., one or more CU-CPs, one or more CU-UPs, and/or the like), one or more DUs, one or more radio transmitters, and/or the like proposed for inclusion in or association with VRAN 110.

Figure 1C:
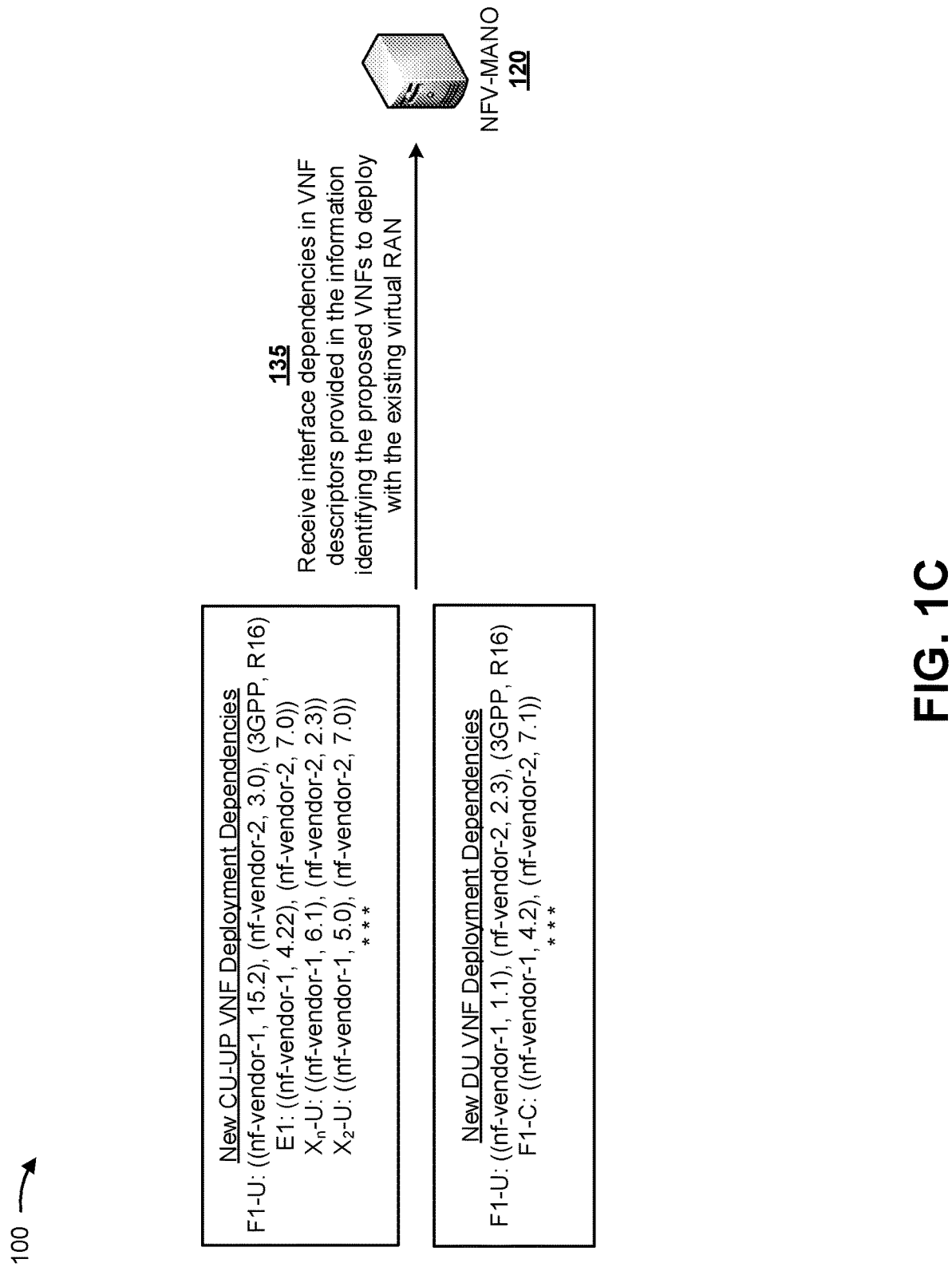

As shown in FIG. 1C, and by reference number 135, NFV-MANO 120 may receive interface dependencies in VNF descriptors provided in the information identifying the proposed VNFs to deploy with the existing virtual RAN. For example, NFV-MANO 120 may receive the VNF descriptors based on a request for identification of proposed VNFs to deploy with VRAN 110. In some implementations, NFV-MANO 120 may extract the interface dependencies from the VNF descriptors included in the information identifying the proposed VNFs. Additionally, or alternatively, NFV-MANO 120 may obtain the interface dependencies from sources other than the VNF descriptors, in other formats, and/or the like.

In some implementations, each of the interface dependencies may include information identifying an interface name, a VNF name associated with the interface name, a version identifier associated with the VNF name, a plurality of VNF names associated with the interface name, a plurality of version identifiers associated with the plurality of VNF names, and/or the like. In some implementations, each interface name, VNF name, version identifier, and/or the like may be represented as a tuple or in another format. For example, each interface dependency may include an interface name and a plurality of tuples that identify a plurality of VNF names associated with the interface name and a plurality of version identifiers associated with the plurality of VNF names. When a proposed VNF that is fully compliant with a specific version of a standard (e.g., the Third Generation Partnership Project (3GPP), the Open Radio Access Network (O-RAN) Alliance, the European Telecommunications Standards Institute (ETSI), and/or the like), an interface dependency may include information indicating that a VNF that strictly complies with the specific version of the standard will be compatible with the proposed VNF.

As further shown in FIG. 1C, for a proposed new CU-UP VNF, the VNF descriptors may include an interface dependency for an F1-U interface, an interface dependency for an E1 interface, an interface dependency for an $X_n$-U interface, an interface dependency for an $X_2$-U interface, and/or the like. The interface dependency for the F1-U interface may include, for example, an interface name (e.g., F1-U), a first VNF name associated with a first vendor (e.g., nf-vendor-1), a version identifier (e.g., 15.2) associated with the nf-vendor-1, a second VNF name associated with a second vendor (e.g., nf-vendor-2), a version identifier (e.g., 3.0) associated with the nf-vendor-2, information (e.g., 3GPP, R16) indicating that the proposed VNF is fully compliant with version R16 of the 3GPP, and/or the like. The interface dependency for the E1 interface may include, for example, an interface name (e.g. E1), a first VNF name associated with a first vendor (e.g., nf-vendor-1), a version identifier (e.g., 4.22) associated with the nf-vendor-1, a second VNF name associated with a second vendor (e.g., nf-vendor-2), a version identifier (e.g., 7.0) associated with the nf-vendor-2, and/or the like. The interface dependency for the $X_n$-U interface may include, for example, an interface name (e.g., $X_n$-U), a first VNF name associated with a first vendor (e.g., nf-vendor-1), a version identifier (e.g., 6.1) associated with the nf-vendor-1, a second VNF name associated with a second vendor (e.g., nf-vendor-2), a version identifier (e.g., 2.3) associated with the nf-vendor-2, and/or the like. The interface dependency for the $X_2$-U interface may include, for example, an interface name (e.g., $X_2$-U), a first VNF name associated with a first vendor (e.g., nf-vendor-1), a version identifier (e.g., 5.0) associated with the nf-vendor-1, a second VNF name associated with a second vendor (e.g., nf-vendor-2), a version identifier (e.g., 7.0) associated with the nf-vendor-2, and/or the like.

As further shown in FIG. 1C, for a proposed new DU-UP VNF, the VNF descriptors may include an interface dependency for an F1-U interface, an interface dependency for an F1-C interface, and/or the like. The interface dependency for the F1-U interface may include, for example, an interface name (e.g., F1-U), a first VNF name associated with a first vendor (e.g., nf-vendor-1), a version identifier (e.g., 1.1) associated with the nf-vendor-1, a second VNF name associated with a second vendor (e.g., nf-vendor-2), a version identifier (e.g., 2.3) associated with the nf-vendor 2, information (e.g., 3GPP, R15) indicating that the proposed VNF is fully compliant with version R15 of the 3GPP, and/or the like. The interface dependency for the F1-C interface may include, for example, an interface name (e.g., F1-U), a first VNF name associated with a first vendor (e.g., nf-vendor-1), a version identifier (e.g., 4.2) associated with the nf-vendor-1, a second VNF name associated with a second vendor (e.g., nf-vendor-2), a version identifier (e.g., 7.1) associated with the nf-vendor 2, and/or the like.

Figure 1D:
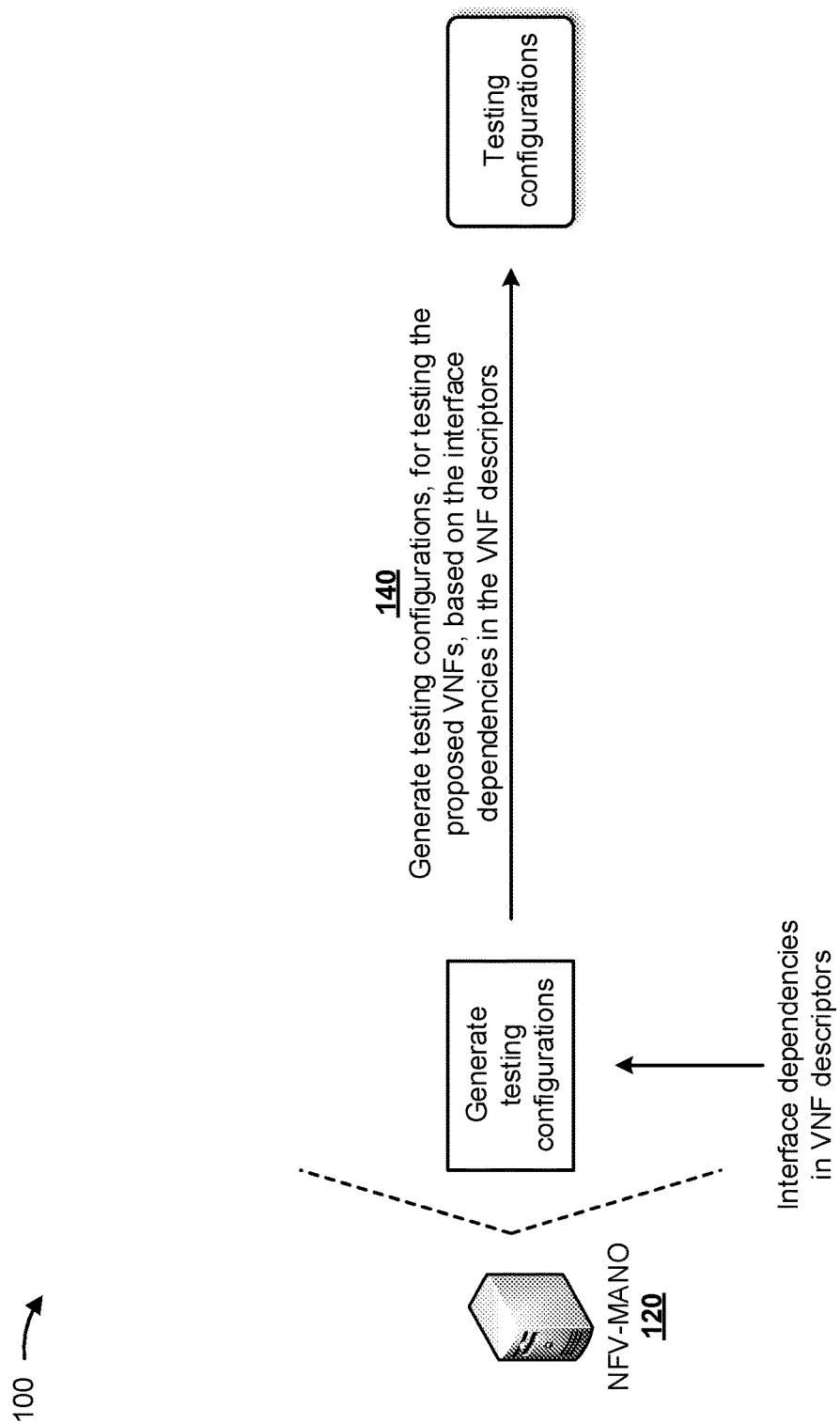

As shown in FIG. 1D, and by reference number 140, NFV-MANO 120 may generate testing configurations, for testing the proposed VNFs, based on the interface dependencies in the VNF descriptors. In some implementations, NFV-MANO 120 may generate a testing configuration for each interface, with combinations of two different proposed VNFs, to determine whether each interface is capable of connecting the two different proposed VNFs. For example, NFV-MANO 120 may generate testing configurations for testing a first interface between a first proposed VNF and a second proposed VNF, between the first proposed VNF and a third proposed VNF, between the second proposed VNF and the third proposed VNF, and/or the like; may generate testing configurations for testing a second interface between the first proposed VNF and the second proposed VNF, between the first proposed VNF and the third proposed VNF, between the second proposed VNF and the third proposed VNF, and/or the like; may generate testing configurations for testing a third interface between the first proposed VNF and the second proposed VNF, between the first proposed VNF and the third proposed VNF, between the second proposed VNF and the third proposed VNF, and/or the like; and/or the like.

Figure 1E:
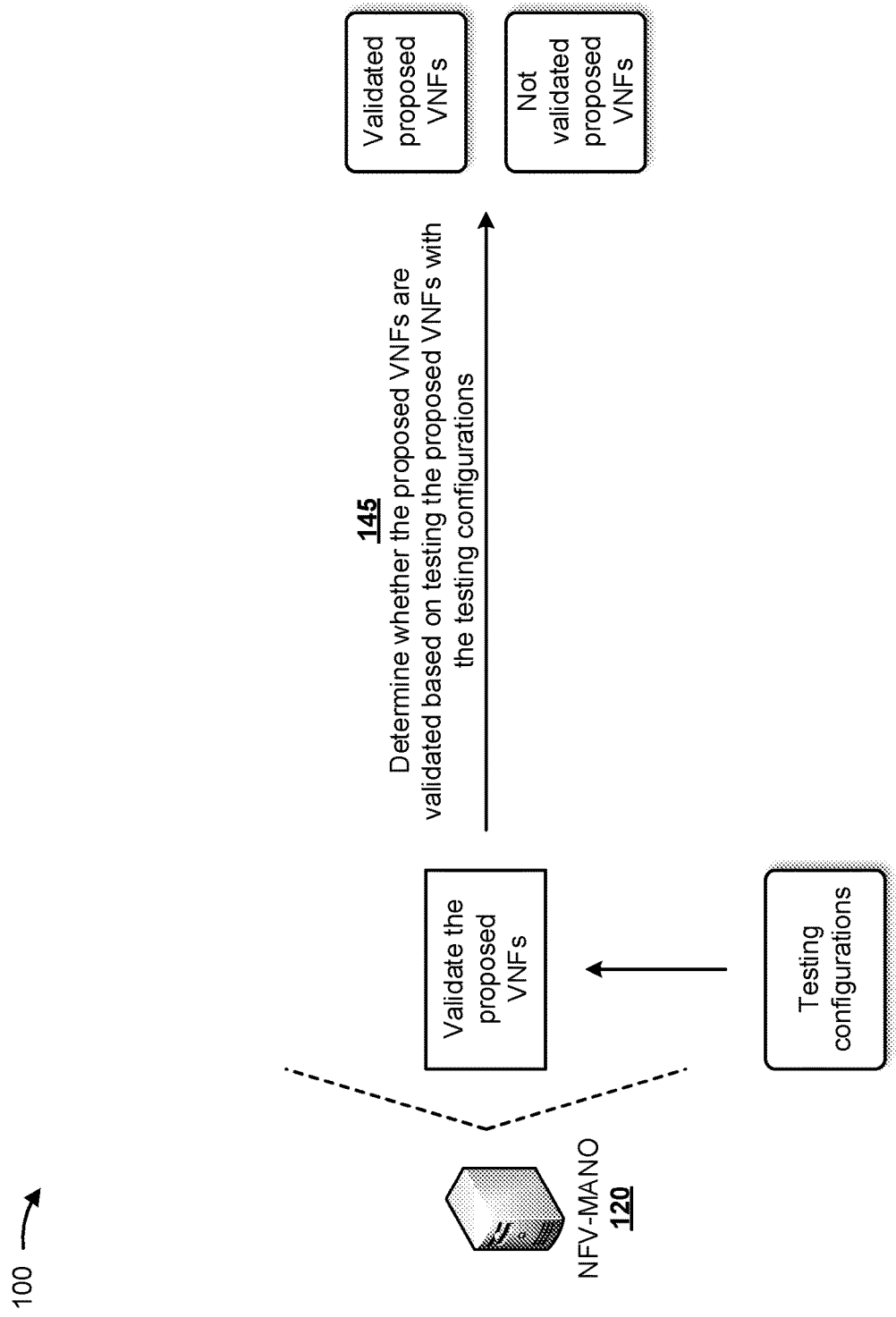

As shown in FIG. 1E, and by reference number 145, NFV-MANO 120 may determine whether the proposed VNFs are validated based on testing the proposed VNFs with the testing configurations. For example, NFV-MANO 120 may determine that a first set of the proposed VNFs are validated based on testing the proposed VNFs with the testing configurations, and may determine that a second set of the proposed VNFs are not validated based on testing the proposed VNFs with the testing configurations. In this way, NFV-MANO 120 may generate a set of validated proposed VNFs and/or a set of not validated proposed VNFs, as shown in FIG. 1E. In some implementations, NFV-MANO 120 may determine whether a proposed VNF is validated based on whether an interface is capable of being provided between the proposed VNF and another proposed VNF and/or between the proposed VNF and an existing VNF provided in VRAN 110. For example, if an interface is capable of being provided between the proposed VNF and another proposed VNF and/or between the proposed VNF and an existing VNF provided in VRAN 110, the proposed VNF may be validated. Alternatively, if an interface is incapable of being provided between the proposed VNF and another proposed VNF and/or between the proposed VNF and an existing VNF provided in VRAN 110, the proposed VNF may be invalidated.

Figure 1F:
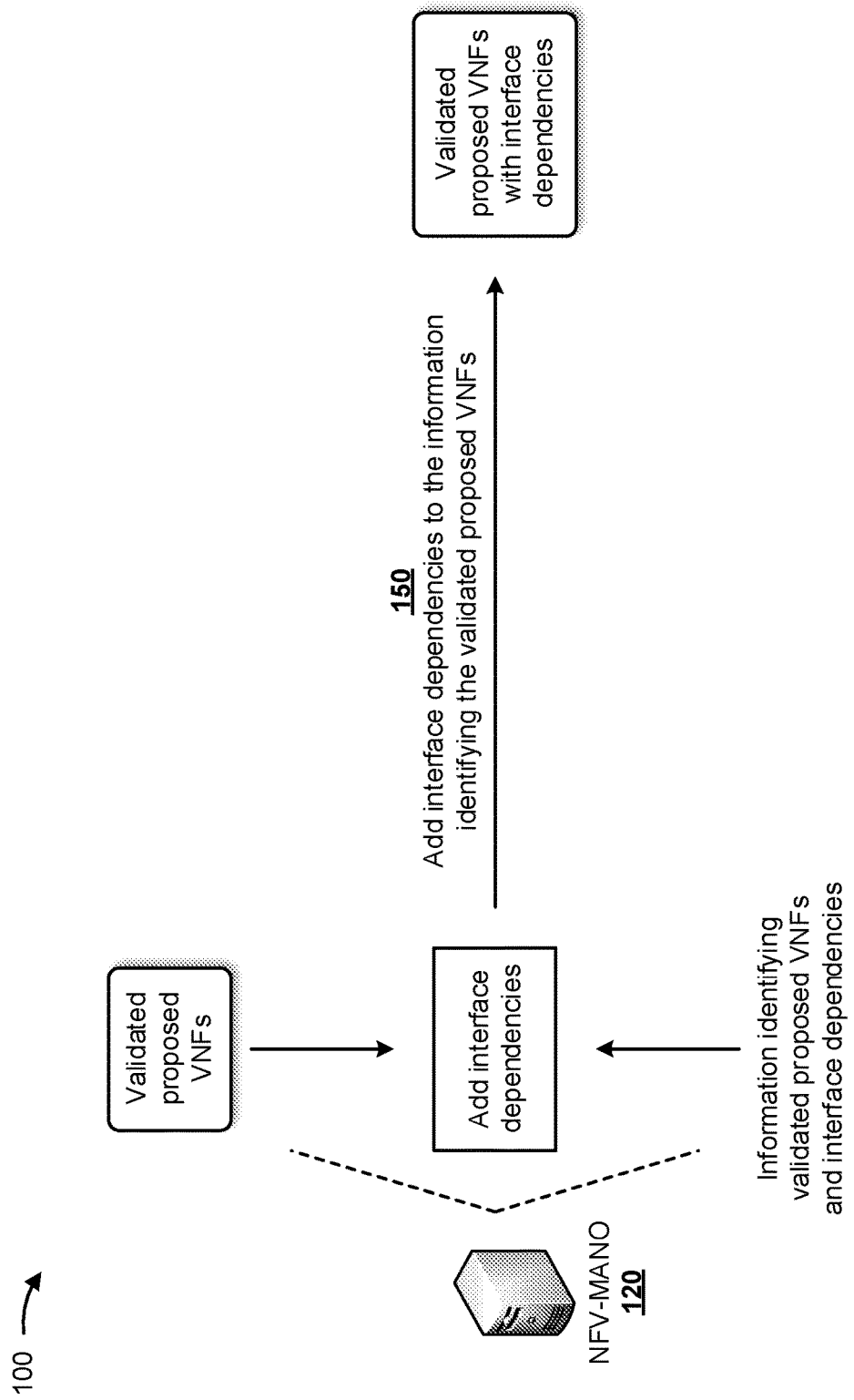

As shown in FIG. 1F, and by reference number 150, NFV-MANO 120 may add interface dependencies to information identifying the validated proposed VNFs. For example, NFV-MANO 120 may add the interface dependencies provided in the VNF descriptors, that correspond to the validated proposed VNFs, to the information identifying the validated proposed VNFs, to generate a set of validated proposed VNFs with the corresponding interface dependencies. In some implementations, NFV-MANO 120 may store the VNF descriptors in a data structure associated with NFV-MANO 120, and may extract the interface dependencies from the VNF descriptors. NFV-MANO 120 may compare the extracted interface dependencies and the information identifying the validated proposed VNFs to determine which of the extracted interface dependencies correspond to the validated proposed VNFs. NFV-MANO 120 may then combine information associated with the corresponding interface dependencies with the information identifying the validated proposed VNFs in order to generate the set of validated proposed VNFs with the corresponding interface dependencies.

Figure 1G:
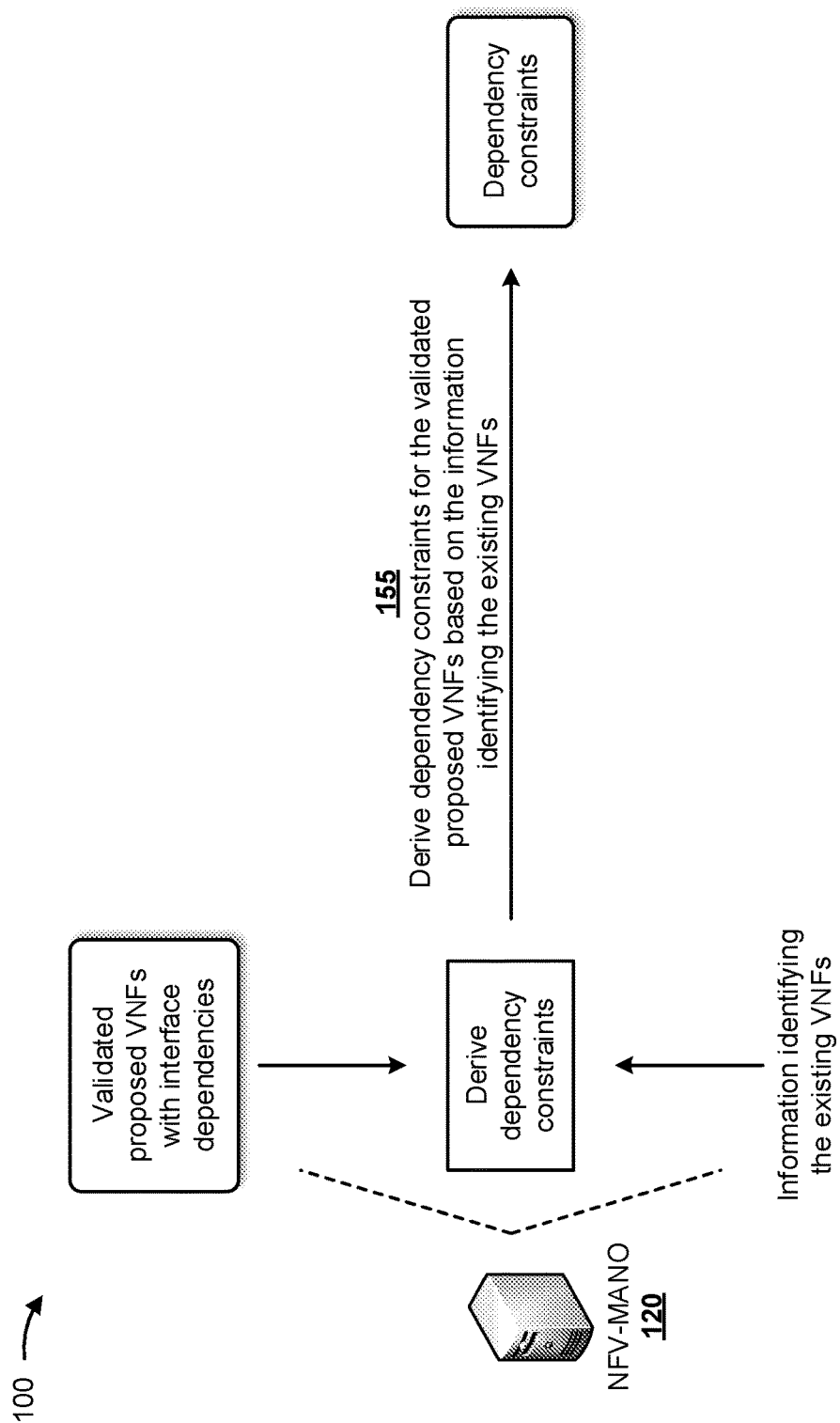

As shown in FIG. 1G, and by reference number 155, NFV-MANO 120 may derive dependency constraints for the validated proposed VNFs based on the information identifying the existing VNFs. For example, NFV-MANO 120 may derive the dependency constraints based on the interface dependencies associated with the validated proposed VNFs and based on the information identifying the existing VNFs. In some implementations, the dependency constraints may include constraints indicating interfaces to utilize between the existing VNFs and the validated proposed VNFs, a constraint based on a geographic location associated with VRAN 110, a constraint based on resource availability associated with VRAN 110, a constraint based on slice capabilities associated with VRAN 110, and/or the like.

For example, NFV-MANO 120 may determine which interfaces to utilize between the existing VNFs and the validated proposed VNFs based on determining which interfaces, identified by the interface dependencies associated with the validated proposed VNFs, are capable of being utilized between the existing VNFs and the validated proposed VNFs. In another example, NFV-MANO 120 may determine the geographic location of VRAN 110, and may determine whether the geographic location prevents utilization of any of the interfaces identified by the interface dependencies associated with the validated proposed VNFs (e.g., fourth generation (4G) network interfaces may not be utilized in a 5G network). In another example, NFV-MANO 120 may determine the resource availability of VRAN 110, and may determine whether the resource availability prevents utilization of any of the interfaces identified by the interface dependencies associated with the validated proposed VNFs.

Figure 1H:
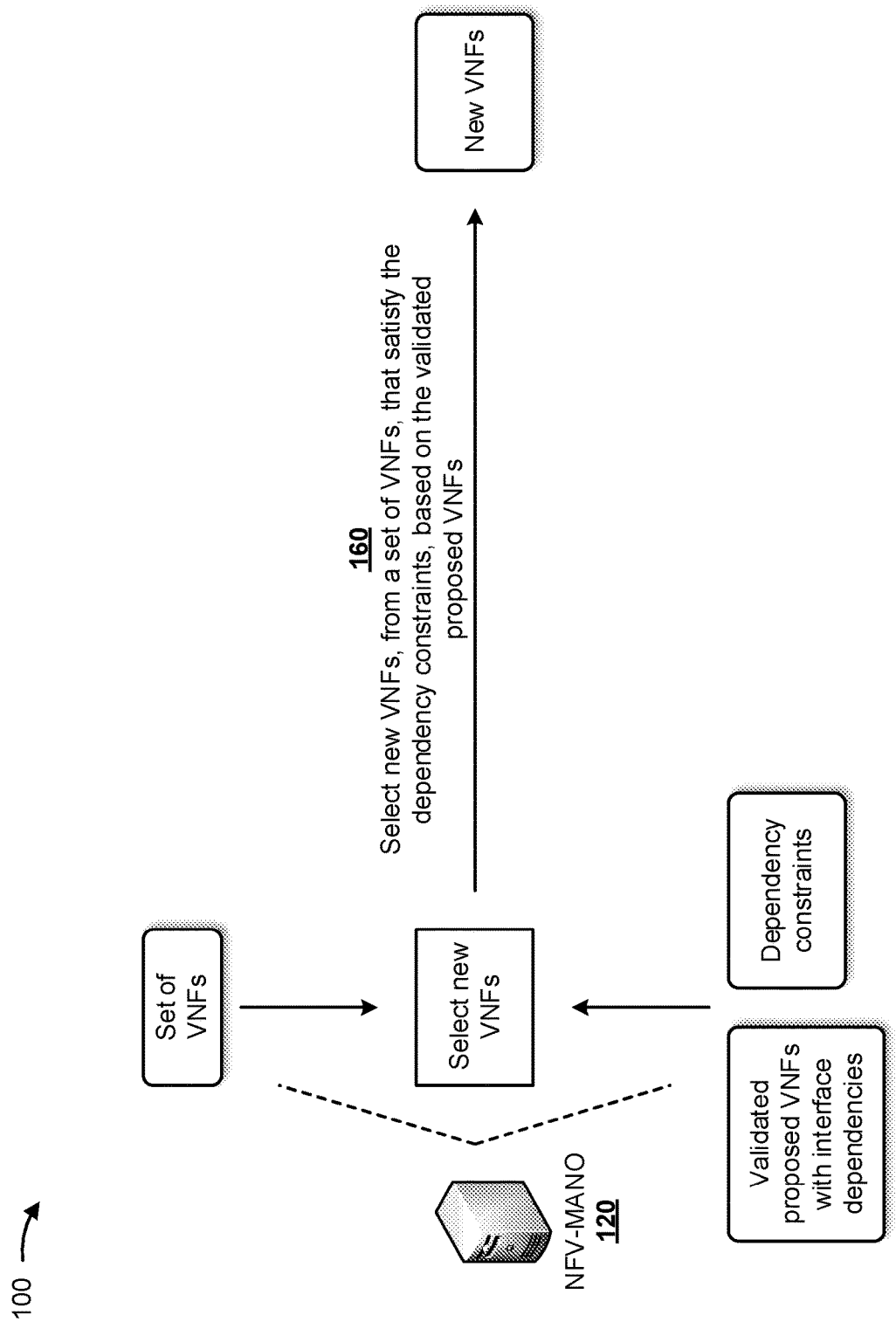

As shown in FIG. 1H, NFV-MANO 120 may receive information identifying a set of VNFs from a data structure (e.g., a catalog) associated with NFV-MANO 120. In some implementations, the information identifying the set of VNFs may include information identifying predetermined VNFs capable of being deployed in a VRAN, such as VRAN 110 or other types of VRANs. Each VNF in the set of VNFs may be capable of performing a function associated with a VRAN, such as performing a function associated with a CU, a DU, and/or the like. In some implementations, multiple VNFs, associated with different vendors, different versions, different standards, and/or the like, may be capable of performing the same function. For example, the data structure may include a catalog identifying the set of VNFs capable of being deployed in a VRAN, physical network devices capable of connecting with the set of VNFs, rules for interconnecting of the set of VNFs, the physical network devices, and/or the like. In this way, NFV-MANO 120 may maintain and/or utilize a real-time inventory of VNFs that can be utilized, as described herein, to provide on-demand changes to a network topology, automated deployment of new VNFs, automated deployment of a new VRAN, and/or the like.

As further shown in FIG. 1H, and by reference number 160, NFV-MANO 120 may select new VNFs, from the set of VNFs, that satisfy the dependency constraints, based on the information identifying the validated proposed VNFs. In some implementations, NFV-MANO 120 may select the new VNFs from the data structure (e.g., the catalog) identifying the set of predetermined VNFs. For example, for each validated proposed VNF, NFV-MANO 120 may select, from the data structure, a new VNF that satisfies one or more dependency constraints associated with the validated proposed VNF. In some implementations, if there are multiple predetermined VNFs in the catalog that satisfy the dependency constraints associated with the validated proposed VNFs, NFV-MANO 120 may select the new VNFs based on one or more parameters. The one or more parameters may include a parameter indicating a policy rule (e.g., a required security configuration) for deployment of a new VNF, a parameter indicating a licensing rule (e.g., a required licensing arrangement with a vendor of a VNF) for the deployment of a new VNF, a parameter indicating a user preference for the deployment of a new VNF, and/or the like.

Figure 1I:
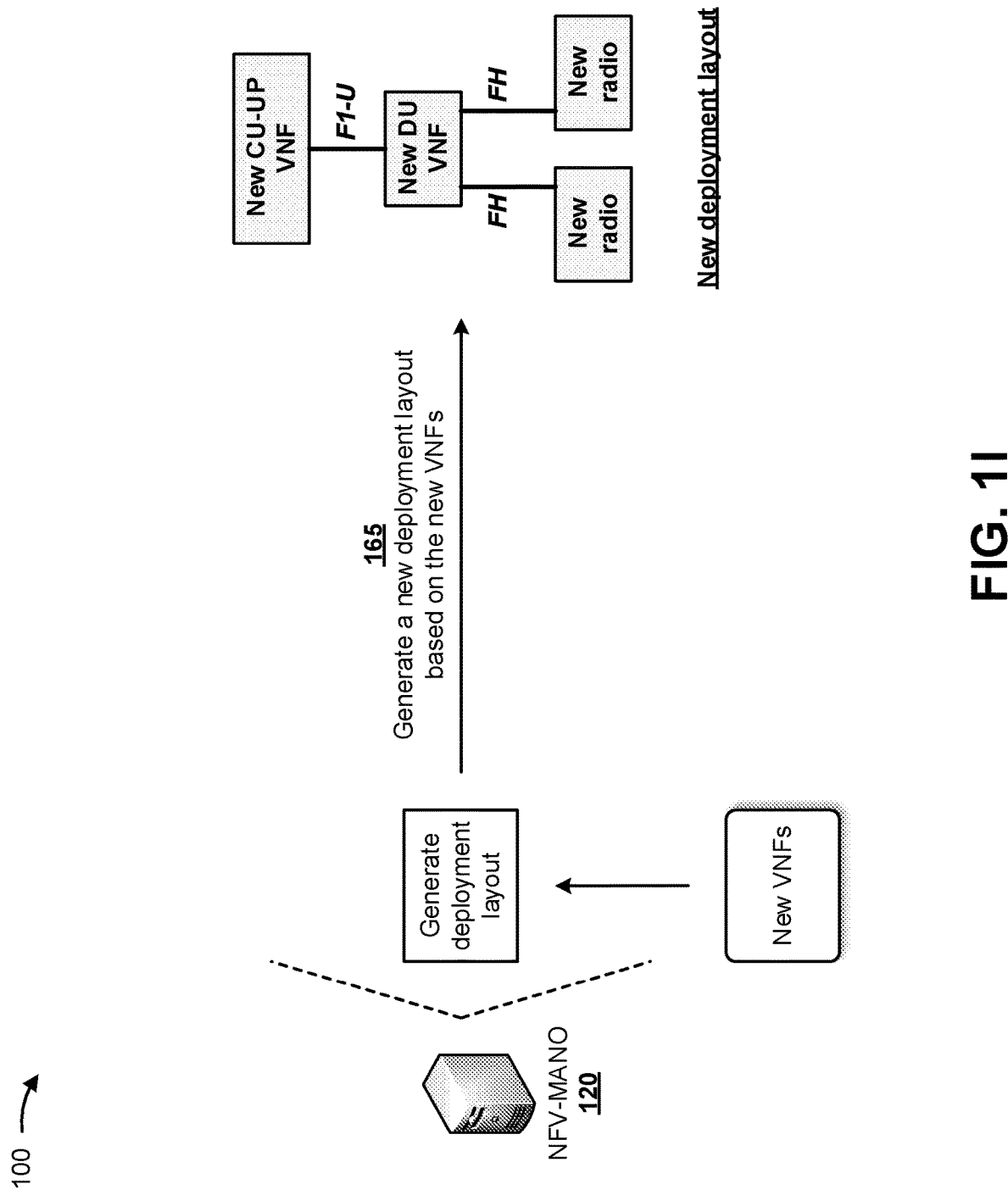

As shown in FIG. 1I, and by reference number 165, NFV-MANO 120 may generate a new deployment layout based on the selected new VNFs. In some implementations, generating the new deployment layout may include determining locations for the new VNFs, interfaces between the new VNFs, interfaces between the new VNFs and existing VNFs in VRAN 110, and/or the like. For example, as shown in FIG. 1I, the new deployment layout may include a new CU-UP VNF, a new DU VNF, a first new radio transmitter, and a second new radio transmitter. In this example, NFV-MANO 120 may determine locations for the new CU-UP VNF, the new DU VNF, the first new radio transmitter, and the second new radio transmitter; may determine an interface between the new CU-UP VNF and the new DU VNF (e.g., an F1-U interface); may determine an interface between the new DU VNF and the first new radio transmitter (e.g., an FH interface); may determine an interface between the new DU VNF and the second new radio transmitter (e.g., an FH interface); may determine interfaces between the new CU-UP transmitter and existing VNFs in VRAN 110; may determine interfaces between the new DU VNF and existing VNFs in VRAN 110; and/or the like.

Figure 1J:
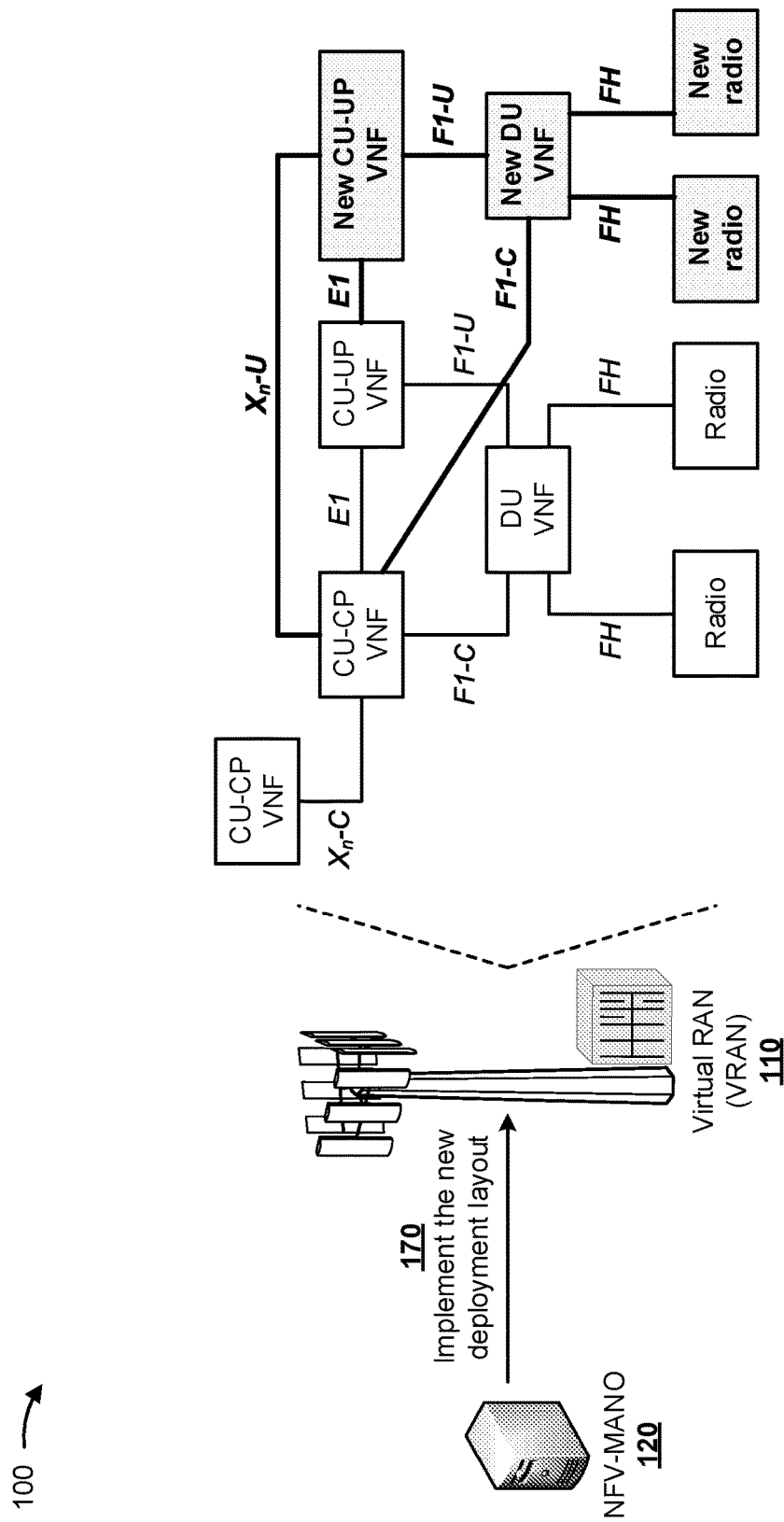

As shown in FIG. 1J, and by reference number 170, NFV-MANO 120 may implement the new deployment layout with the existing VRAN 110. In some implementations, NFV-MANO 120 may cause one or more interfaces to be established between the new VNFs and one or more of the existing VNFs, and may cause one or more services to be provided by the new VNFs and the one or more of the existing VNFs. The one or more interfaces may be compatible with the one or more of the existing VNFs. In this way, NFV-MANO 120 may ensure that the new VNFs may interconnect with the existing VNFs, which may prevent interconnection issues and conserve resources associated with addressing interconnection issues.

As further shown in FIG. 1J, NFV-MANO 120 may, for example, implement the new deployment layout that includes the new CU-UP VNF, the new DU VNF, the first new radio transmitter, and the second new radio transmitter with the existing VRAN 110. NFV-MANO 120 may establish interfaces between the new CU-UP VNF and one or more of the existing VNFs of VRAN 110, and between the new DU VNF and one or more of the existing VNFs of VRAN 110. As shown, NFV-MANO 120 may establish a new interface between the first existing CU-CP VNF and the new CU-UP VNF (e.g., an $X_n$-U interface), may establish a new interface between the second existing CU-UP VNF and the new CU-UP VNF (e.g., an E1 interface), and may establish a new interface between the first existing CU-CP VNF and the new DU VNF (e.g., an F1-C interface).

In this way, by including network interface dependencies and/or compatibilities in VNF descriptors, NFV-MANO 120 automatically packages and deploys VNFs in a network, such as a 5G network. NFV-MANO 120 provides a real-time, on-demand solution that enables proper interconnectivity of new VNFs in the network with existing VNFs for utilization efficiency, mobility support, and/or the like. Thus, NFV-MANO 120 conserves computing resources, communication resources, networking resources, and/or the like that would otherwise be wasted unsuccessfully attempting to implement changes to existing networks with VNFs, deploy new VNFs in the existing networks, generate a new network with new VNFs, and/or the like.

As indicated above, FIGS. 1A-1J are provided merely as examples. Other examples may differ from what was described with regard to FIGS. 1A-1J. The number and arrangement of devices and networks shown in FIGS. 1A-1J are provided as an example. In practice, there may be additional devices and/or networks, fewer devices and/or networks, different devices and/or networks, or differently arranged devices and/or networks than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) of FIGS. 1A-1J may perform one or more functions described as being performed by another set of devices of FIGS. 1A-1J.

Figure 2:
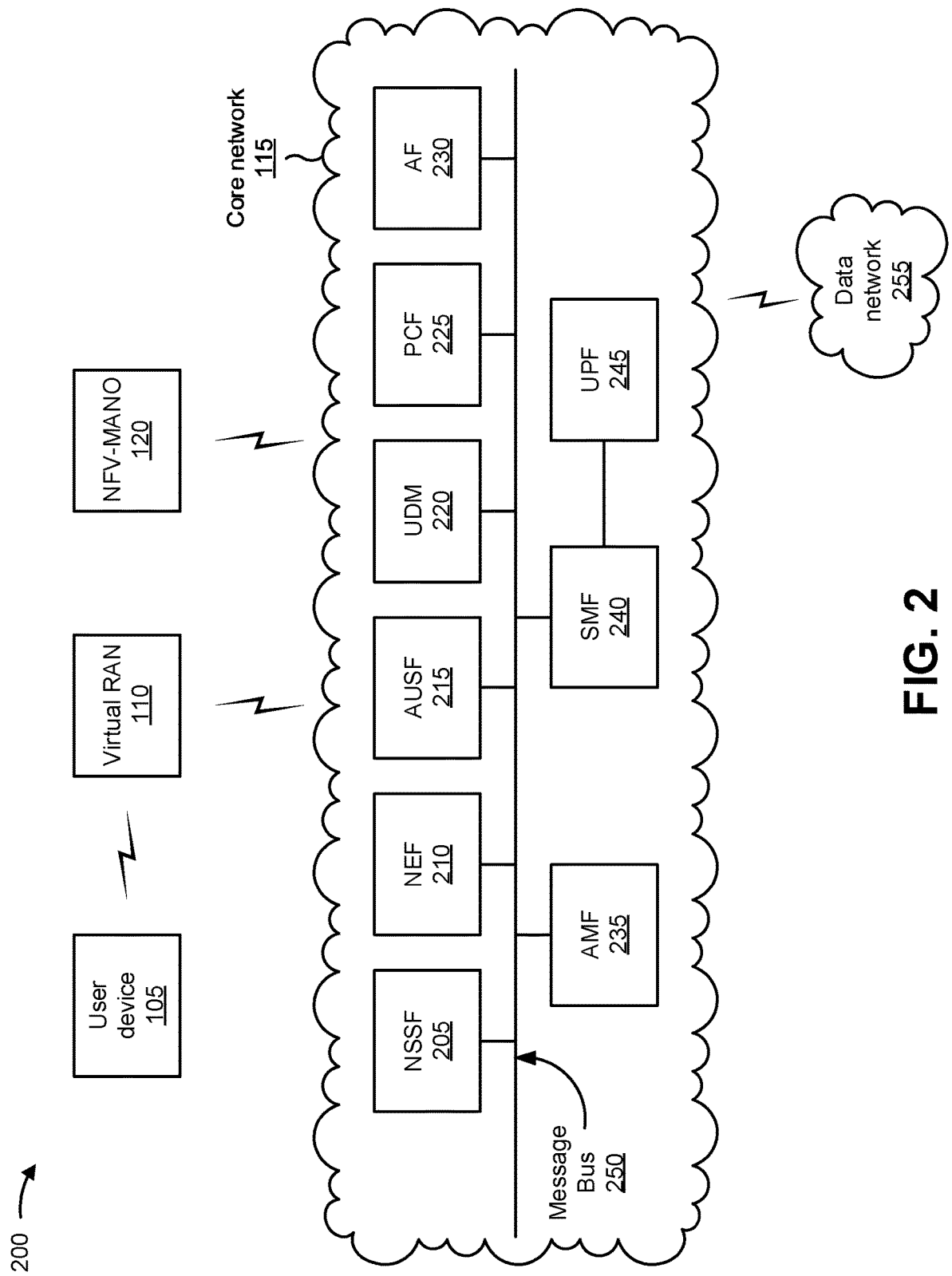
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include user device 105, VRAN 110, core network 115, NFV-MANO 120, and a data network 255. Devices and/or networks of example environment 200 may interconnect via wired connections, wireless connections, or a combination of wired and wireless connections.

User device 105 includes one or more devices capable of receiving, generating, storing, processing, and/or providing information, such as information described herein. For example, user device 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

VRAN 110 may support, for example, a cellular radio access technology (RAT). VRAN 110 may include multiple centralized unit (CUs), multiple distributed units (DUs), multiple radio transmitters, and/or the like. A CU may coordinate access control and communication with regard to multiple DUs. A DU may provide user devices 105 and/or other VRANs 110 with access to data network 255 via core network 115. The radio transmitters may include base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user device 105. VRAN 110 may transfer traffic between user device 105 (e.g., using a cellular RAT), base stations (e.g., using a wireless interface or a backhaul interface, such as a wired backhaul interface), and/or core network 115. VRAN 110 may provide one or more cells that cover geographic areas.

In some implementations, VRAN 110 may perform scheduling and/or resource management for user devices 105 covered by VRAN 110 (e.g., user devices 105 covered by a cell provided by VRAN 110). In some implementations, VRAN 110 may be controlled or coordinated by a network controller, which may perform load balancing, network-level configuration, and/or the like. The network controller may communicate with VRAN 110 via a wireless or wireline backhaul. In some implementations, VRAN 110 may include a network controller, a self-organizing network (SON) module or component, or a similar module or component. In other words, VRAN 110 may perform network control, scheduling, and/or network management functions (e.g., for uplink, downlink, and/or sidelink communications of user devices 105 covered by VRAN 110).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for user device 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating user devices 105 in the wireless telecommunications system.

UDM 220 includes one or more devices that store user data and profiles in the wireless telecommunications system. UDM 220 may be used for fixed access, mobile access, and/or the like, in core network 115.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communications sessions in the wireless telecommunications system. For example, SMF 240 may configure traffic steering policies at UPF 245, enforce user device IP address allocation and policies, and/or the like.

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like.

Message bus 250 represents a communication structure for communication among the functional elements. In other words, message bus 250 may permit communication between two or more functional elements.

NFV-MANO 120 is an architectural framework for managing and orchestrating VNFs and other software components. NFV-MANO 120 facilitates deployment and connection of services that are removed from dedicated physical devices and moved to virtual machines (VMs). NFV-MANO 120 includes functional blocks, such as an NFV orchestrator, a VNF manager, a virtualized infrastructure manager (VIM), and/or the like. The functional blocks are responsible for deploying and connecting functions and services when the functions and services are needed throughout a network. The NFV orchestrator includes a service orchestration layer and a resource orchestration layer that control integration of new network services and VNFs into a virtual framework. The NFV orchestrator also validates and authorizes NFV infrastructure (NFVI) resource requests. The VNF manager oversees a lifecycle of VNF instances. The VIM controls and manages NFV infrastructure, which encompasses compute, storage, network resources, and/or the like.

NFV-MANO 120 works with templates for standard VNFs so that users can select from existing network functions virtualization infrastructure (NFVi) resources to deploy an NFV platform. NFV-MANO 120 may be integrated with application program interfaces (APIs) in existing systems in order to work with multivendor technologies across multiple network domains. In some implementations, NFV-MANO 120 may perform the functions described above in connection with FIGS. 1A-1J.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
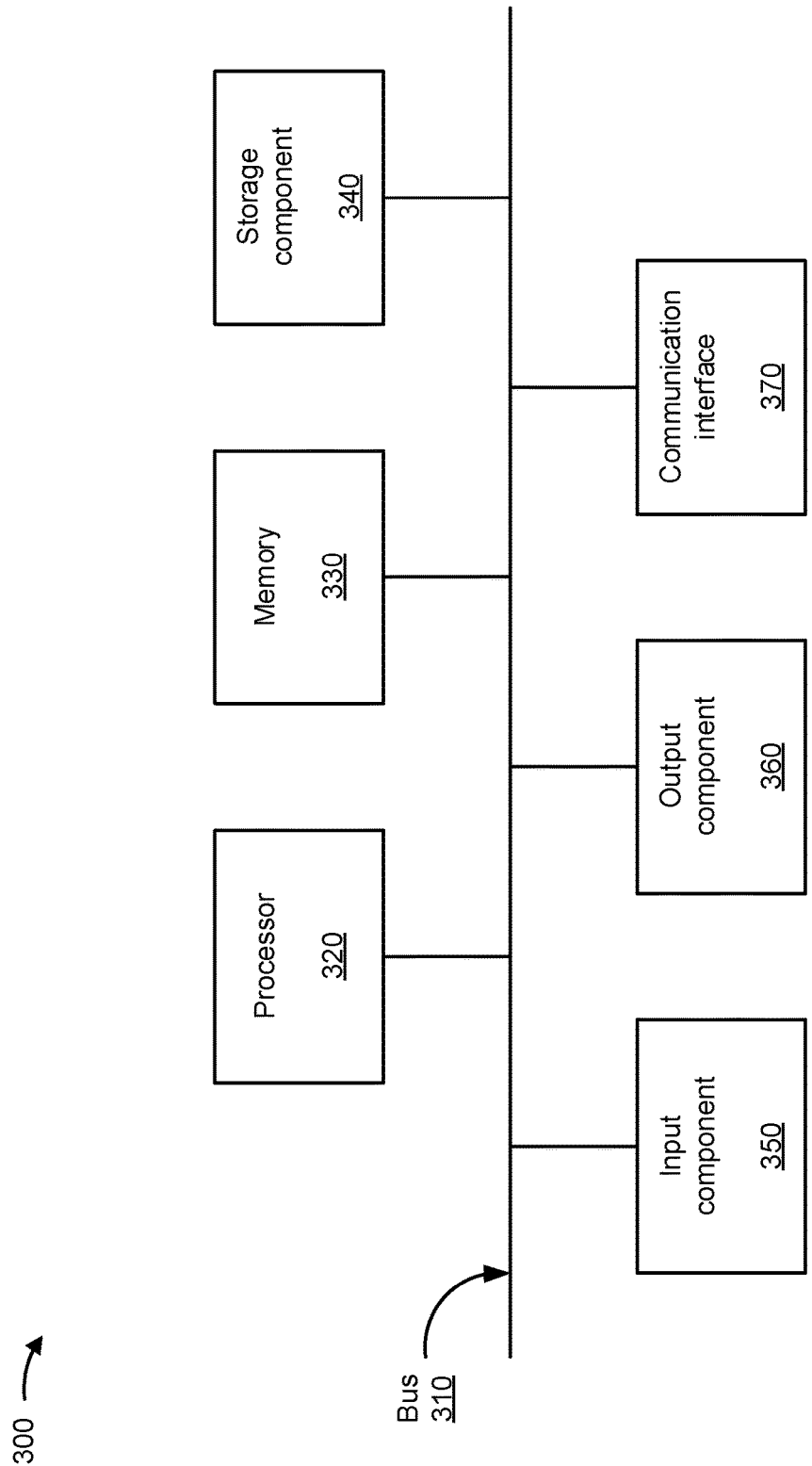
FIG. 3 is a diagram of example components of one or more devices of FIG. 2.

FIG. 3 is a diagram of example components of a device 300. Device 300 may correspond to user device 105, NFV-MANO 120, NSSF 205, NEF 210, AUSF 215, UDM 220, PCF 225, AF 230, AMF 235, SMF 240, and/or UPF 245. In some implementations, user device 105, NFV-MANO 120, NSSF 205, NEF 210, AUSF 215, UDM 220, PCF 225, AF 230, AMF 235, SMF 240, and/or UPF 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
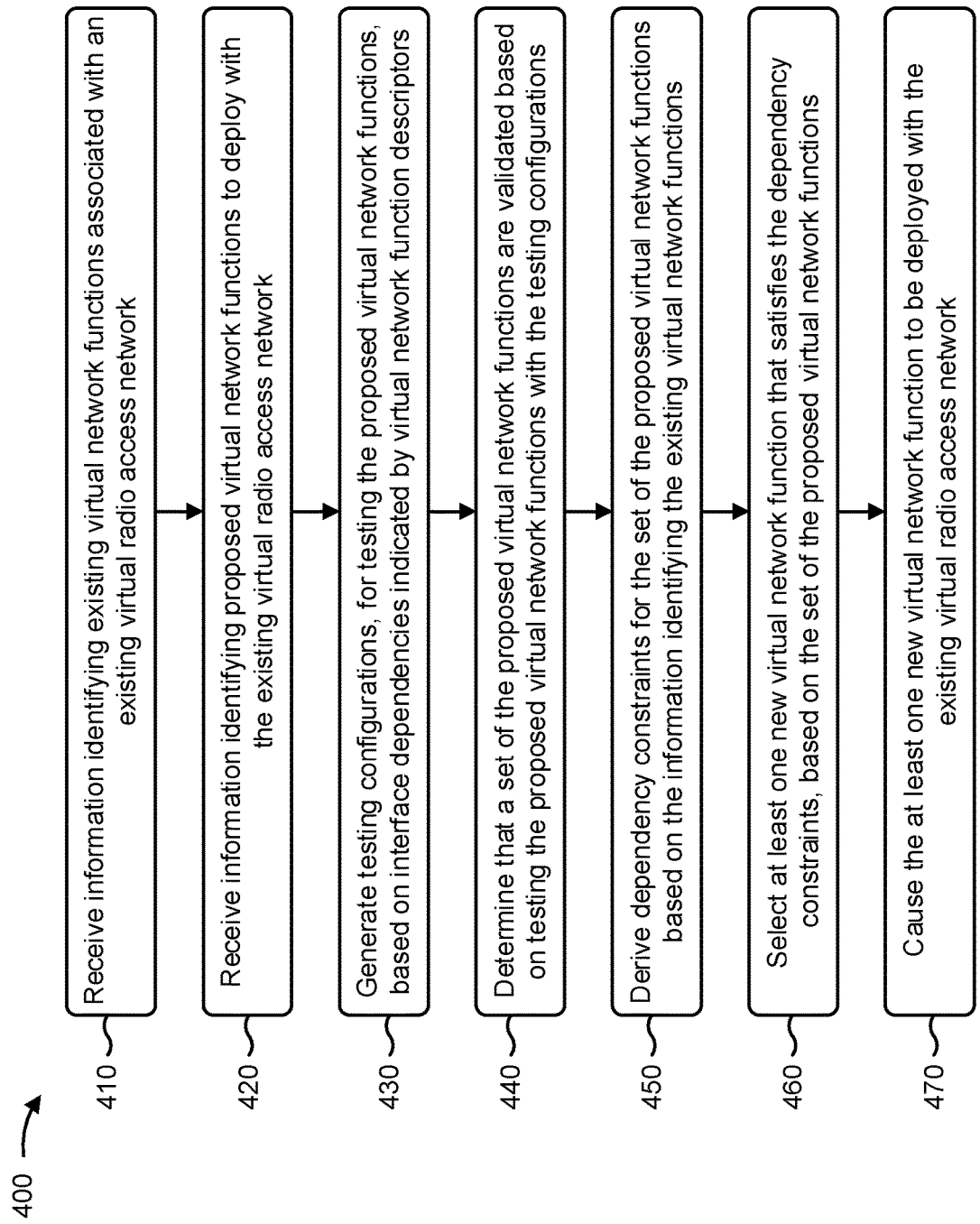
FIG. 4 is a flow chart of an example process for automatically packaging and deploying virtual network functions (VNFs) in a network based on network interface dependencies and/or compatibilities.

FIG. 4 is a flow chart of an example process 400 for automatically packaging and deploying virtual network functions (VNFs) in a network based on network interface dependencies and/or compatibilities. In some implementations, one or more process blocks of FIG. 4 may be performed by a device (e.g., NFV-MANO 120). In some implementations, one or more process blocks of FIG. 4 may be performed by another device or a group of devices separate from or including the device, such as a user device (e.g., user device 105).

As shown in FIG. 4, process 400 may include receiving information identifying existing virtual network functions associated with an existing virtual radio access network (block 410). For example, the device (e.g., using processor 320, communication interface 370, and/or the like) may receive information identifying existing virtual network functions associated with an existing virtual radio access network, as described above. The existing virtual network functions may include one or more virtual centralized units and one or more distributed units.

As further shown in FIG. 4, process 400 may include receiving information identifying proposed virtual network functions to deploy with the existing virtual radio access network (block 420). For example, the device (e.g., using processor 320, communication interface 370, and/or the like) may receive information identifying proposed virtual network functions to deploy with the existing virtual radio access network, as described above. In some implementations, the information identifying the proposed virtual network functions may include virtual network function descriptors indicating interface dependencies associated with the proposed virtual network functions. Each of the interface dependencies may include information identifying: an interface name, a virtual network function name, and a version associated with the virtual network function name.

As further shown in FIG. 4, process 400 may include generating testing configurations, for testing the proposed virtual network functions, based on the interface dependencies indicated by the virtual network function descriptors (block 430). For example, the device (e.g., using processor 320, memory 330, and/or the like) may generate testing configurations, for testing the proposed virtual network functions, based on the interface dependencies indicated by the virtual network function descriptors, as described above.

As further shown in FIG. 4, process 400 may include determining that a set of the proposed virtual network functions are validated based on testing the proposed virtual network functions with the testing configurations (block 440). For example, the device (e.g., using processor 320, storage component 340, and/or the like) may determine that a set of the proposed virtual network functions are validated based on testing the proposed virtual network functions with the testing configurations, as described above. Process 400 may further include including information identifying the interface dependencies with information identifying the set of the proposed virtual network functions. Determining that the set of the proposed virtual network functions are validated may include process 400 determining that a first set of the proposed virtual network functions are not validated based on testing the proposed virtual network functions with the testing configurations, and determining that a second set of the proposed virtual network functions are validated based on testing the proposed virtual network functions with the testing configurations, wherein the second set of the proposed virtual network functions may correspond to the set of the proposed virtual network functions.

As further shown in FIG. 4, process 400 may include deriving dependency constraints for the set of the proposed virtual network functions based on the information identifying the existing virtual network functions (block 450). For example, the device (e.g., using processor 320, memory 330, storage component 340, and/or the like) may derive dependency constraints for the set of the proposed virtual network functions based on the information identifying the existing virtual network functions, as described above. The dependency constraints may include one or more of constraints indicating interfaces to utilize with the existing virtual network functions, a constraint based on a geographic location associated with the existing virtual radio access network, a constraint based on resource availability associated with the existing virtual radio access network, a constraint based on slice capabilities associated with the existing virtual radio access network, and/or the like.

As further shown in FIG. 4, process 400 may include selecting at least one new virtual network function that satisfies the dependency constraints, based on the set of the proposed virtual network functions (block 460). For example, the device (e.g., using processor 320, memory 330, and/or the like) may select at least one new virtual network function that satisfies the dependency constraints, based on the set of the proposed virtual network functions, as described above. In some implementations, the at least one new virtual network function may be deployed with the existing virtual radio access network. Selecting the at least one new virtual network function may include process 400 selecting, based on one or more parameters, the at least one new virtual network function from a catalog identifying a plurality of predetermined virtual network functions. The one or more parameters may include one or more of a parameter indicating a policy rule for deployment of the at least one new virtual network function, a parameter indicating a licensing rule for the deployment of the at least one new virtual network function, a parameter indicating a user preference for the deployment of the at least one new virtual network function, and/or the like.

As further shown in FIG. 4, process 400 may include causing the at least one new virtual network function to be deployed with the existing virtual radio access network (block 470). For example, the device (e.g., using processor 320, memory 330, storage component 340, communication interface 370, and/or the like) may cause the at least one new virtual network function to be deployed with the existing virtual radio access network, as described above.

Process 400 may include additional implementations, such as any single implementation or any combination of implementations described below and/or in connection with one or more other processes described elsewhere herein.

In some implementations, the at least one new virtual network function may include a plurality of new virtual network functions, and process 400 may further include generating a new deployment layout for the plurality of new virtual network functions; and causing the new deployment layout to be implemented with the existing virtual radio access network. Causing the new deployment layout to be implemented with the existing virtual radio access network may include process 400 causing one or more interfaces to be established between the plurality of new virtual network functions and one or more of the existing virtual network functions, and causing a service to be provided by the plurality of new virtual network functions and the one or more of the existing virtual network functions. The one or more interfaces may be compatible with the one or more of the existing virtual network functions.

In some implementations, process 400 may include causing a service, associated with the at least one new virtual network function, to be implemented.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, information identifying existing virtual network functions associated with an existing virtual radio access network;
   receiving, by the device, information identifying proposed virtual network functions to deploy with the existing virtual radio access network,
      wherein the information identifying the proposed virtual network functions includes virtual network function descriptors indicating interface dependencies associated with the proposed virtual network functions;
   generating, by the device, testing configurations, for testing the proposed virtual network functions, based on the interface dependencies indicated by the virtual network function descriptors;
   determining, by the device, that a set of the proposed virtual network functions are validated based on testing the proposed virtual network functions with the testing configurations;
   deriving, by the device, dependency constraints for the set of the proposed virtual network functions based on the information identifying the existing virtual network functions;
   selecting, by the device, at least one new virtual network function that satisfies the dependency constraints, based on the set of the proposed virtual network functions,
      wherein the at least one new virtual network function is to be deployed with the existing virtual radio access network; and
   causing, by the device, the at least one new virtual network function to be deployed with the existing virtual radio access network.

2. The method of claim 1, further comprising:
   including information identifying the interface dependencies with the information identifying the set of the proposed virtual network functions.

3. The method of claim 1, wherein selecting the at least one new virtual network function comprises:
   selecting, the at least one new virtual network function from a catalog identifying a plurality of predetermined virtual network functions.

4. The method of claim 3, wherein the selecting is based on one or more parameters that include one or more of:
   a parameter indicating a policy rule for deployment of the at least one new virtual network function,
   a parameter indicating a licensing rule for the deployment of the at least one new virtual network function, or
   a parameter indicating a user preference for the deployment of the at least one new virtual network function.

5. The method of claim 1, wherein the at least one new virtual network function includes a plurality of new virtual network functions, and the method further comprises:
   generating a new deployment layout for the plurality of new virtual network functions; and
   causing the new deployment layout to be implemented with the existing virtual radio access network.

6. The method of claim 1, wherein each of the interface dependencies includes information identifying:
   an interface name,
   a virtual network function name, and
   a version associated with the virtual network function name.

7. The method of claim 1, further comprising:
   causing a service, associated with the at least one new virtual network function, to be implemented.

8. A device, comprising:
   one or more memories; and
   one or more processors, communicatively coupled to the one or more memories, configured to:
      receive information identifying existing virtual network functions associated with an existing virtual radio access network;
      receive information identifying proposed virtual network functions to deploy with the existing virtual radio access network,
         wherein the information identifying the proposed virtual network functions includes virtual network function descriptors indicating interface dependencies associated with the proposed virtual network functions;
      generate testing configurations, for testing the proposed virtual network functions, based on the interface dependencies indicated by the virtual network function descriptors;
      determine that a set of the proposed virtual network functions are validated based on testing the proposed virtual network functions with the testing configurations;
      derive dependency constraints for the set of the proposed virtual network functions based on the information identifying the existing virtual network functions;
      select at least one new virtual network function that satisfies the dependency constraints, based on the set of the proposed virtual network functions,
         wherein the at least one new virtual network function is to be deployed with the existing virtual radio access network;
      generate a new deployment layout based on the at least one new virtual network function; and
      cause the new deployment layout to be implemented with the existing virtual radio access network.

9. The device of claim 8, wherein the dependency constraints include one or more of:
   constraints indicating interfaces to utilize with the existing virtual network functions,
   a constraint based on a geographic location associated with the existing virtual radio access network,
   a constraint based on resource availability associated with the existing virtual radio access network, or
   a constraint based on slice capabilities associated with the existing virtual radio access network.

10. The device of claim 8, wherein the device includes a network functions virtualization management and orchestration (NFV-MANO) device.

11. The device of claim 8, wherein the one or more processors, when causing the new deployment layout to be implemented with the existing virtual radio access network, are configured to:
   cause one or more interfaces to be established between the at least one new virtual network function and one or more of the existing virtual network functions; and cause a service to be provided by the at least one new virtual network function and the one or more of the existing virtual network functions.

12. The device of claim 11, wherein the one or more interfaces are compatible with the one or more of the existing virtual network functions.

13. The device of claim 8, wherein the existing virtual network functions include:
one or more virtual centralized units, and
one or more distributed units.

14. The device of claim 8, wherein the one or more processors, when determining that the set of the proposed virtual network functions are validated, are configured to:
determine that a first set of the proposed virtual network functions are not validated based on testing the proposed virtual network functions with the testing configurations; and
determine that a second set of the proposed virtual network functions are validated based on testing the proposed virtual network functions with the testing configurations,
wherein the second set of the proposed virtual network functions corresponds to the set of the proposed virtual network functions.

15. A non-transitory computer-readable medium storing instructions, the instructions comprising:
one or more instructions that, when executed by one or more processors, cause the one or more processors to:
receive information identifying existing virtual network functions associated with an existing virtual radio access network;
receive information identifying proposed virtual network functions to deploy with the existing virtual radio access network,
wherein the information identifying the proposed virtual network functions includes virtual network function descriptors indicating interface dependencies associated with the proposed virtual network functions;
identify a set of proposed virtual network functions, from the proposed virtual network functions to deploy with the existing virtual radio access network, based on the interface dependencies indicated by the virtual network function descriptors;
derive dependency constraints for the set of the proposed virtual network functions based on the information identifying the existing virtual network functions;
select a plurality of new virtual network functions that satisfies the dependency constraints, based on the set of the proposed virtual network functions; and
cause the plurality of new virtual network functions to be deployed with the existing virtual radio access network.

16. The non-transitory computer-readable medium of claim 15, wherein the one or more instructions, that cause the one or more processors to select the plurality of new virtual network functions, cause the one or more processors to:
select, based on one or more parameters, the plurality of new virtual network functions from a catalog identifying a plurality of predetermined virtual network functions,
wherein the one or more parameters include one or more of:
a parameter indicating a policy rule for deployment of the plurality of new virtual network functions,
a parameter indicating a licensing rule for the deployment of the plurality of new virtual network functions, or
a parameter indicating a user preference for the deployment of the plurality of new virtual network functions.

17. The non-transitory computer-readable medium of claim 15, wherein the one or more instructions, that cause the one or more processors to cause the plurality of new virtual network functions to be deployed with the existing virtual radio access network, cause the one or more processors to:
generate a new deployment layout for the plurality of new virtual network functions; and
cause the new deployment layout to be implemented with the existing virtual radio access network.

18. The non-transitory computer-readable medium of claim 15, wherein each of the interface dependencies includes information identifying:
an interface name,
a virtual network function name, and
a version associated with the virtual network function name.

19. The non-transitory computer-readable medium of claim 15, wherein the dependency constraints include one or more of:
constraints indicating interfaces to utilize with the existing virtual network functions,
a constraint based on a geographic location associated with the existing virtual radio access network,
a constraint based on resource availability associated with the existing virtual radio access network, or
a constraint based on slice capabilities associated with the existing virtual radio access network.

20. The non-transitory computer-readable medium of claim 15, wherein the one or more instructions, that cause the one or more processors to cause the plurality of new virtual network functions to be deployed with the existing virtual radio access network, cause the one or more processors to:
cause one or more interfaces to be established between the plurality of new virtual network functions and one or more of the existing virtual network functions; and
cause a service to be provided by the plurality of new virtual network functions and the one or more of the existing virtual network functions.

* * * * *